United States Patent
Yu

(12) 
(10) Patent No.: US 6,667,123 B2
(45) Date of Patent: Dec. 23, 2003

(54) DOWN-SIZED WATER-GAS-SHIFT REACTOR

(75) Inventor: Paul Taichiang Yu, Pittsford, NY (US)

(73) Assignee: General Motors Corporation, Detroit, MI (US)

(*) Notice: Subject to any disclaimer, the term of this patent is extended or adjusted under 35 U.S.C. 154(b) by 176 days.

(21) Appl. No.: 10/005,910

(22) Filed: Dec. 4, 2001

(65) Prior Publication Data

US 2002/0122965 A1 Sep. 5, 2002

Related U.S. Application Data

(63) Continuation-in-part of application No. 09/435,672, filed on Nov. 8, 1999, now abandoned.

(51) Int. Cl.⁷ .............................. H01M 8/06; C01B 3/12
(52) U.S. Cl. ........................ 429/17; 423/247; 423/655
(58) Field of Search ........................... 429/13, 17, 19, 429/20; 423/246, 247, 650, 651, 652, 655, 656

(56) References Cited

U.S. PATENT DOCUMENTS

| | | | |
|---|---|---|---|
| 5,284,717 A | 2/1994 | Yamase et al. | 429/17 |
| 5,432,021 A | 7/1995 | Wilkinson et al. | 429/17 |
| 6,162,558 A | 12/2000 | Borup et al. | 429/19 |
| 6,183,895 B1 | 2/2001 | Kudo et al. | 429/20 |
| 6,238,640 B1 | 5/2001 | Eguchi et al. | 423/437.2 |
| 6,375,924 B1 * | 4/2002 | Towler et al. | 423/656 |

FOREIGN PATENT DOCUMENTS

SU  217383  6/1979

* cited by examiner

*Primary Examiner*—Susy Tsang-Foster
(74) *Attorney, Agent, or Firm*—Cary W. Brooks

(57) ABSTRACT

Reducing the size of a water-gas-shift reactor by injecting oxygen into the tail section thereof to react the oxygen with CO in the tail section without consuming untoward amounts of hydrogen.

2 Claims, 2 Drawing Sheets

DOWN-SIZED WATER-GAS-SHIFT REACTOR

RELATED APPLICATION

This is a continuation-in-part of U.S. patent application Ser. No. 09/435,672 filed on Nov. 8, 1999, now abandoned, and assigned to the assignee of the present invention.

TECHNICAL FIELD

The present invention relates to a technique for downsizing a water-gas shift reactor used in a mobile PEM fuel cell system.

BACKGROUND OF THE INVENTION

Fuel cells electrochemically produce electricity from reactants supplied externally thereto, and have been proposed for many applications including mobile electric vehicle power plants to replace, or supplement, internal combustion engines. Hydrogen is often used as the fuel, and is supplied to the fuel cell's anode. Oxygen (as air) is used as the oxidant and is supplied to the cell's cathode. For mobile (e.g. vehicular) applications, the hydrogen fuel may be derived from liquid hydrocarbon fuels (e.g., methanol or gasoline) in a catalytic fuel processing reactor. For example, in the case of methanol, methanol and water (vapors) are reacted under isothermal conditions in a catalytic reactor known as a steam reformer that generates hydrogen and carbon dioxide according to the following ideal endothermic reaction:

$$CH_3OH + H_2O \rightarrow CO_2 + 3H_2$$

This reaction is carried out within a steam reformer that is heated by exhaust gases from a methanol-fired and/or hydrogen-fired combuster, and yields a reformate gas comprising hydrogen, carbon dioxide, carbon monoxide, and water. One such reformer is described in U.S. Pat. No. 4,650,727 to Vanderborgh, and one such combuster is described in U.S. Pat. No. 6,232,005 issued May 15, 2001 and U.S. Pat. No. 6,077,620 issued Jun. 20, 2000 in the name of William Pettit, and assigned to General Motors Corporation, assignee of the present invention. Gasoline is a more complex reaction and may be reacted in a so-called autothermal reactor which comprises a partial oxidation (POX) reactor upstream of a steam reformer to partially oxidize the gasoline before steam reforming.

Unfortunately, the reformate/effluent exiting the steam reformer contains untoward amounts of carbon monoxide that is toxic to the catalyst in the fuel cell and must be removed, or at least reduced to very low concentrations (i.e., less than about 0.00005 mole fraction). It is known that the carbon monoxide, CO, content of the reformate can be reduced by the so-called "water-gas shift" reaction that can either take place within itself (depending on the operating conditions of the reformer), or, more typically, in one or more separate shift reactors located downstream from the reformer. In the water-gas shift reaction, water (i.e., steam) reacts with the carbon monoxide in the reformate according to the following ideal exothermic shift reaction:

$$CO + H_2O \rightarrow CO_2 + H_2$$

In one known arrangement, a first shift reactor (i.e., in a two-reactor series) is a high-temperature, adiabatic shift reactor in which the reformate enters at a first temperature and exits at a somewhat higher temperature. Thereafter, the reformate is cooled and enters a second shift reactor which is an isothermal, low temperature shift reactor in which the inlet and outlet temperatures of the reformate is essentially the same. Shift reactor(s) comprise(s) a housing containing a catalyst bed through which the reformate flows, and to which steam is added. The first, or high temperature, shift reactors operate at about 350° C.–450° C., and typically use a non-noble metal catalyst such as a mixture of $Fe_3O_4$ and $Cr_2O_3$ (i.e., about 55 wt % Fe and 6% Cr). The second, or low temperature, shift reactors, on the other hand, operate at about 200° C.–260° C., and use a non-noble metal catalyst such as $Cu$—$ZnO$—$Al_2O_3$, or $Cu$—$ZnO$—$Cr_2O_3$. Some CO still survives the water-gas shift reaction.

CO concentration in the reformate must be reduced to below 0.00005 mole fraction before the reformate can be used in the fuel cell without poisoning the fuel cell catalyst. It is known to further reduce the CO content of $H_2$-rich reformate exiting a shift reactor by selectively reacting it with air at a temperature of about 210° C.–260° C. in a so-called "PrOx" (i.e., preferential oxidation) reaction that is carried out in a PrOx reactor having a noble metal catalyst. In the PrOx reactor, the air preferentially oxidizes the CO, in the presence of the $H_2$, but without consuming/oxidizing substantial quantities of the $H_2$. The PrOx reaction is exothermic and proceeds as follows:

$$CO + \tfrac{1}{2}O_2 \rightarrow CO_2$$

When the system reaches steady state, and the CO level is low enough, the PrOx reactor effluent is supplied to the fuel cell. Before the CO level is low enough, the PrOx effluent is shunted around the fuel cell for temporary use elsewhere in the system.

Vehicular fuel cell power plants need to be as compact as possible. Unfortunately, the water-gas-shift reactor is generally quite large because it requires a significant amount of catalyst. Much of the catalyst is needed toward the later half of the reactor (i.e., in the direction of reformate flow through the reactor) where the concentration of the CO is lowest and closer to equilibrium, and hence requires a significant amount of catalyst to effect the final stages of CO removal. This large amount of catalyst adds to the volume and cost of the shift reactor and adds to the time required to bring the reactor up to its preferred superambient operating temperature during start-up of the fuel cell system.

SUMMARY OF THE INVENTION

The present invention contemplates a technique for reducing the size of, and amount of catalyst needed for, a water-gas-shift reactor without compromising the ability of the reactor to remove a sufficient amount of the CO that the effluent can be treated in a PrOx reactor to render it non-toxic to a fuel cell. More specifically, the present invention contemplates process and apparatus for injecting a small amount of oxygen into the tail section of a water-gas-shift reactor operating under steady state conditions to consume the low levels of CO in the reformate therein and thereby eliminate excess catalyst otherwise needed to effect the water-gas shift reactor thereat. By tail section is meant that portion of the water-gas-shift-reactor that (1) is downstream of the reactor's inlet, and (2) receives reformate from an upstream portion of the reactor that has a CO content of about 2% by volume More specifically yet, the present invention relates to a fuel cell system comprising a PEM fuel cell for electrochemically reacting a hydrogen-rich fuel gas stream with oxygen (i.e., from air) to produce electricity. The hydrogen-rich fuel/gas stream supplied to the fuel cell has a sufficiently low concentration of carbon monoxide as to be tolerable by the fuel cell (i.e., less than about 0.00005 mole fraction, or 50 ppm). The fuel gas stream is produced from a liquid hydrocarbon (e.g., methanol or gasoline) in a first catalytic reactor (e.g. a steam reformer) located upstream of the fuel cell. The output from the first reactor has a concentration of carbon monoxide that is too high to be used in the fuel cell. A low temperature water-gas-shift reactor is therefore positioned intermediate the first catalytic reactor and the fuel cell and serves to reduce higher carbon monoxide concentrations exiting the first catalytic reactor to a lower level closer to that tolerable by the fuel cell. The low temperature water-gas-shift reactor will preferably be an isothermal reactor having an internal heat exchanger construction suitable to removing reactor-generated heat therefrom. The low temperature water-gas-shift reactor may, or may not, be preceded by a high temperature shift reactor. Each shift reactor comprises a housing encasing a catalyst bed that promotes the reaction between steam and the carbon monoxide in the fuel gas exiting the first reactor at a superambient operating temperature established for the reactor to most efficiently promote the reaction when the shift reactor is operating under normal operating conditions.

The low temperature shift reactor comprises an upstream catalyst portion adjacent the reactor inlet end (i.e. where reformate enters the reactor), and a downstream catalyst portion, or tail section, adjacent the reactor outlet end. The tail section is that portion of the reactor that begins at the point in the catalyst bed in the direction of flow therethrough where the concentration of the CO in the reformate is about 2% by volume. In a typical low temperature water-gas-shift reactor this occurs about halfway through the bed.

In accordance with the present invention, the tail section is equipped with an oxygen distributor that distributes $O_2$ (as air) throughout the catalyst bed in the tail section for consuming the carbon monoxide in the tail section. The oxygen injected into the tail section exothermically reacts with the carbon monoxide (and hydrogen as well) in the reformate passing through the tail section of the catalyst bed to significantly drop its concentration without the need for the amount of catalyst otherwise needed for steam to effect the same low CO level.

The overall system includes: (1) a hydrogen-fueled PEM fuel cell; (2) a catalytic reactor upstream of the fuel cell that, under normal operating conditions, produces a hydrogen-containing fuel gas stream from a liquid hydrocarbon for fueling the fuel cell, which stream is contaminated with a first concentration of carbon monoxide that is too high for the fuel cell to tolerate; and (3) at least one shift reactor intermediate the catalytic reactor and the fuel cell for reducing the concentration of the carbon monoxide in the fuel gas stream to a second concentration less than the first concentration, and closer to that tolerable by the fuel cell, when the system is operating under normal operating conditions. The shift reactor(s) comprise(s) a housing encasing a catalyst bed for reacting the carbon monoxide in the fuel gas stream with water (i.e. steam) at a superambient operating temperature established for the most effective use of the catalyst when the system is operating under normal operating conditions. The reactor has an upstream portion adjacent the reactor's inlet and a downstream portion (aka tail section) adjacent the reactor's outlet. The tail section is that portion of the reactor that is downstream of the upstream portion and begins where the reformate has a CO concentration of about 2% by volume. In accordance with the process aspect of the invention, $O_2$ (i.e. as air) is injected into the tail section of the reactor to consume the CO therein and reduce the CO concentration in the water-gas-shift reactor effluent to levels that can readily be removed to non-toxic levels in a PrOx reactor. The $O_2+CO\rightarrow$reaction occurs quickly on a significantly less volume of catalyst than would otherwise be required to accomplish the same result using only the water-gas-shift reaction alone.

DESCRIPTION OF THE DRAWINGS

The invention will be better understood when considered in the light of the following detailed description of a representative embodiment thereof which is given hereafter in conjunction with the several drawings in which.

DESCRIPTION OF THE PREFERRED EMBODIMENT

Figure 1:
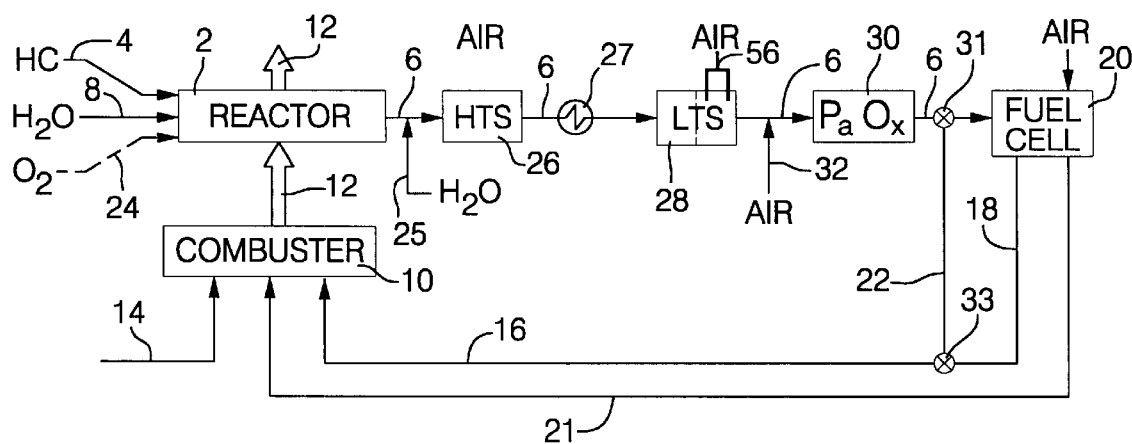
FIG. 1 is a schematic of a PEM fuel cell system.

FIG. 1 depicts a simplified vehicular fuel cell system in accordance with the present invention. A fuel reactor 2 comprises a catalytic reactor that converts a liquid hydrocarbon fuel (e.g. methanol or gasoline) 4 into a fuel stream 6 comprising principally hydrogen, carbon dioxide and water as well as an undesirable amount of carbon monoxide that would be toxic to the fuel cell is allowed to persist. When the hydrocarbon is methanol, the fuel reactor 2 may be a steam reformer, well known in the art, that catalytically reacts the methanol 4 with steam 8 to produce a fuel stream 6, often referred to as "reformate". The steam reforming reaction is endothermic, and requires external heat which is often obtained from the exhaust gases 12 of a combuster (flame or catalytic) 10 that is fueled by methanol 14 from the vehicle's fuel tank and/or hydrogen 16 supplied either (1) from the exhaust 18 from fuel cell 20, or (2) from a fuel cell bypass loop 22 during start-up of the system. One such combuster is shown in Pettit, supra. When the hydrocarbon is gasoline, the fuel reactor 2 may be (1) a steam reformer, (2) a partial oxidation (POX) reactor that reacts the gasoline with oxygen 24 (from air), or (3) a combination of both a partial oxidation reactor and steam reformer which is known in the art as an "auto-thermal" reformer. The $O_2$ input 24 to the reactor 2 is shown in dashed line since it will only be used when a POX reactor is used ahead of a reformer. Regardless of what form the fuel reactor 2 may take, the fuel stream 6 produced thereby contains carbon monoxide levels that are toxic to the catalysts used in the fuel cell 20. Accordingly, the carbon monoxide must be removed or its concentration lowered.

It is common practice to remove much of the carbon monoxide from the fuel gas stream 6 exiting the fuel reactor 2 by subjecting it to a water-gas-shift reaction where the stream 6 is catalytically reacted with water (i.e. as steam) 25 to form more $CO_2$ and $H_2$. The water-gas-shift reaction may be accomplished in a single low temperature shift reactor, or often in a two stage shift reactor wherein the fuel stream 6 first passes through a high temperature shift reactor (HTS) 26, and thence through a low temperature shift reactor (LTS) 28. By high temperature shift reactor is meant an adiabatic shift reactor having a catalyst (i.e., Fe oxide or chromium oxide) operable to effect the water-gas-shift reaction about 350° C.–450° C. By low temperature shift reactor is meant an isothermal shift reactor having a catalyst (i.e. Cu—ZnO) operable to effect the water-gas-shift reaction at about 200° C.-260° C. A heat exchanger 27 cools the reformate 6 exiting the high temperature shift reactor 26 before it enters the low temperature shift reactor 28. As the fuel stream 6 exiting the shift reaction is still too rich in carbon monoxide (i.e. about 0.6%–1.0%) to be used directly in the fuel cell 20, it is common practice to subject the fuel stream 6 exiting the shift reactions to a preferential oxidation (PrOx) reaction in a PrOx reactor 30 wherein a limited amount of air 32 is selectively, exothermically reacted with the carbon monoxide, rather than the hydrogen, over a suitable catalyst that promotes such selectivity. When the system is operating under normal steady state conditions, the fuel stream 6 exiting the PrOx reactor 30 is sufficiently CO-free (i.e. less than about 0.00005 mole fraction CO) that it can be used in the fuel cell 20 without poisoning the catalyst, and is routed to the anode side of the fuel cell 20. Hydrogen which is not consumed in the fuel cell 20 is routed to the combuster 10 via lines 16 and 18 for burning therein. During system warm-up however, and before the fuel stream 6 leaving the PrOx reactor 30 has an acceptably low CO content, the PrOx outlet gases 6 are shunted around the fuel cell 20 to the combuster 10 by means of line 22, line 16 and coacting 2-way valves 31 and 33. Cathode exhaust gases (i.e. oxygen-depleted air) are routed to the combuster 10 via conduit 21 to burn along with the hydrogen therein.

For vehicular applications (i.e. motive power for electric vehicles) there is a need for a compact fuel cell system. In accordance with the present invention, the size of the system's low temperature water-gas-shift reactor is downsized by injecting a small amount of oxygen (preferably as air) into the tail section of the reactor sufficiently to react with the CO in the fuel stream therein without consuming an untoward amount of hydrogen. By tail section is meant the downstream portion of a two-stage water-gas-shift reactor that begins (i.e. in the direction of gas flow) where the CO concentration in the fuel stream is about 2% by volume. By way of illustration of the magnitude of the downsizing, water-gas-shift reactor volume for a conventional combination of a high temperature shift reactor (HTS) and a low temperature shift reactor (LTS) producing an amount of hydrogen having a theoretical heating valve of 65 KW is about 10.27 liters using a conventional CuZnO catalyst. If the tail section of the LTS reactor has $O_2$ injected thereinto, according to the present invention, the reactor volume could be further reduced to about 7.70 liters (i.e. a 25% reduction in volume over the HTS & LTS combination without $O_2$ injection).

Figure 2:
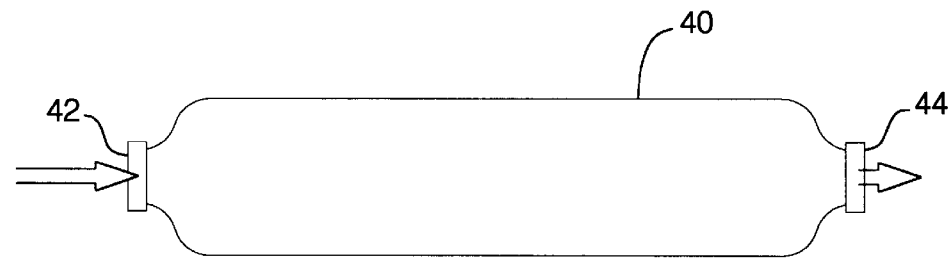
FIG. 2 schematically illustrates a prior art low temperature, water-gas-shift reactor.

FIG. 2 is a schematic illustration of a single stage low temperature water-gas-shift reactor 40 having an inlet 42 and outlet 44. The reactor 40 contains a catalyst bed (not shown) and internal heat exchanger (not shown) for removing reaction-generated heat and maintaining the catalyst bed at a temperature more or less constant in the range of about 200° C.–260° C.

A typical inlet gas (excluding nitrogen from the air) has composition X (i.e. % by volume) shown in Table 1 and a typical outlet gas therefrom has the composition Z, shown in Table 1, as a result of the following reaction that takes place in the reactor 2:

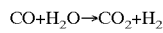

TABLE 1

|  | X | Y | Z |
|---|---|---|---|
| CO | 5.54 | 2.39 | 0.72 |
| $H_2O$ | 20.50 | 17.35 | 15.68 |
| $CO_2$ | 12.25 | 15.40 | 17.07 |
| $H_2$ | 31.55 | 34.70 | 36.37 |

The size of the reactor 40 will, of course, vary with the amount of reformate it must handle. By way of example, a reactor 40 using a conventional CuZnO catalyst will have a volume of about 8.48 liters for processing a reformate flow rate of about 46.62 mole/min (i.e. about 15 mole/min $H_2$).

Figure 3:
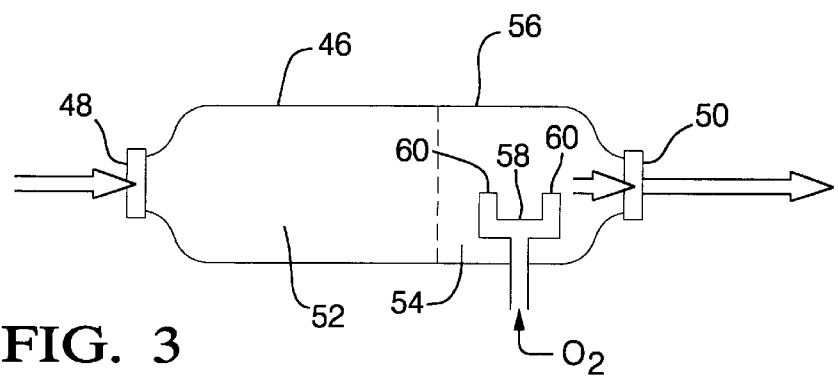
FIG. 3 schematically illustrates a two stage low temperature water-gas-shift reactor in accordance with the present invention.

FIG. 3 schematically illustrates a two stage low temperature water-gas-shift reactor 46 having an inlet 48 and outlet 50. A catalyst bed (not shown) lies intermediate the inlet 48 and outlet 50, and is divided into two portions or stages, an upstream portion 52 adjacent the inlet 48 and a downstream portion 54 located in the tail section 56 of the reactor 46 adjacent the outlet 50. The tail section 56 of the reactor 46 is that portion of the reactor that is downstream from the upstream portion 52 and that receives reformate from the upstream portion having CO concentration of about 2% by volume. The composition of the gas at this point is listed as Y in Table 1. In accordance with the present invention, a small amount of $O_2$ (i.e. as air) is injected into the tail section 56 during the normal operation of the reactor 46 by means of an air distributor 58 having outlets 60. Only enough air to consume the CO is required since excess air consumes an untoward amount of the $H_2$ in the effluent, and reduces the efficiency of the reactor. The oxygen introduced into the effluent stream will comprise less than about one (1) % by volume, and preferably less than about 0.5% by volume of the effluent stream. More than that, unnecessarily consumes $H_2$.

Figure 4:
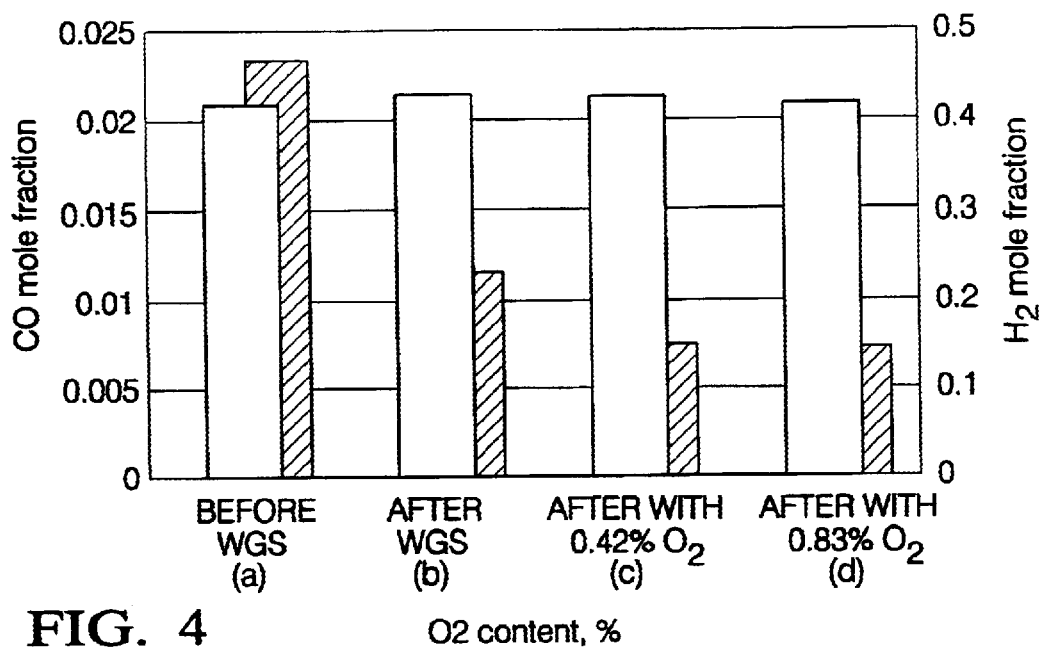
FIG. 4 is a bar graph showing the results of comparative tests conducted to demonstrate the present invention.

FIG. 4 shows the results of tests conducted to demonstrate the present invention. A low temperature water-gas-shift test reactor comprising 30.5 grams of CuZnO catalyst beads was heated to, and maintained at, a temperature of 200° C. This test reactor was used to simulate the downstream portion, or tail section, of a larger two stage water-gas-shift reactor. Synthetic reformate comprising 2.33% CO, 41.71% $H_2$ and the balance water and $CO_2$ was supplied to the inlet end of the test reactor at a flow rate of 0.14 moles/min and the composition of the output gas therefrom analyzed. Bar graph (a) shows the composition of the input gas. Bar graph (b) shows the composition of the reformate exiting the reactor without the $O_2$ addition of the present invention. Bar graph (c) shows the concentrations of CO when $O_2$ is added to form a reaction mix (i.e. inputted gas and air volumes) containing 0.42% $O_2$ by volume. Bar graph (d) shows the CO concentration when $O_2$ is added to form a reaction mix (i.e. inputted gas and air volumes) containing 0.83% $O_2$ by volume.

Figure 5:
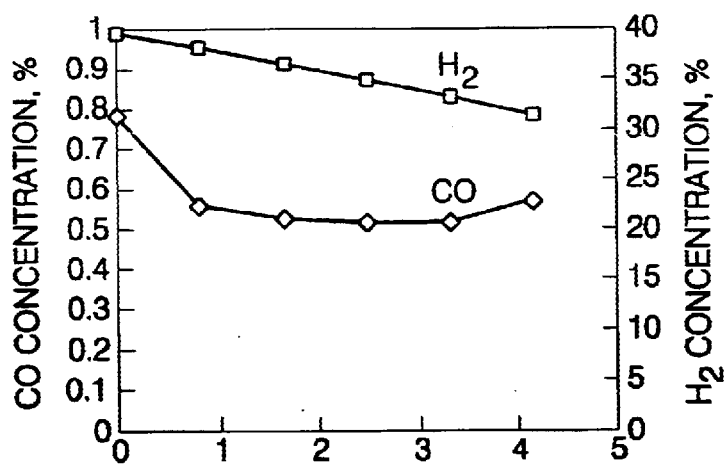
FIG. 5 is a graph showing the effects or $O_2$ addition to the tail section of a water-gas-shift reactor on the CO and $H_2$ concentrations in the effluent therefrom.

FIG. 5 is a plot of the change in reformate composition exiting the water-gas-shift reactor as a function of the amount of $O_2$ injected into the tail section of a low temperature water-gas-shift reactor held at a temperature of 200° C., and pressure of 30 psig. The reactor contained 30.5 grams of CuZnO catalyst, and a gas having an input composition comprising 5.24% CO, 35.24% $H_2$, 16.60% $H_2O$, 16.65% $CO_2$ and the balance $N_2$ was flowed therethrough at a rate of 0.07 mole/min. FIG. 5 indicates that with high CO input levels, $O_2$ concentrations greater than about 1% by volume of the entire gas stream, i.e.

$$\frac{[O_2]}{[O_2]+[CO]+[CO_2]+[H_2O]+[H_2]+[N_2]}$$

do not consume appreciably more CO than the lower $O_2$ concentrations. Rather the extra $O_2$ unnecessarily consumes $H_2$.

From the data it can be concluded that significantly less catalyst (and hence less reactor volume) is needed to reduce the CO to acceptable levels if $O_2$ is injected into the tail section of a low temperature water-gas-shift reactor.

Figure 6:
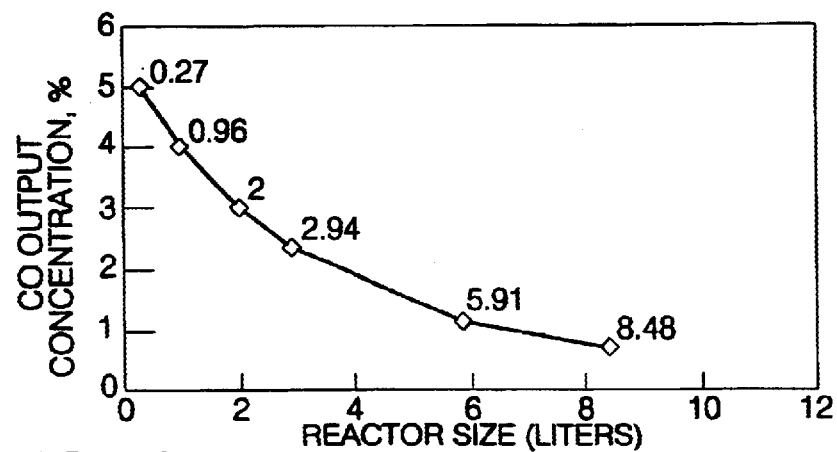
FIG. 6 is a plot (based on a mathematical model) of the size of a low temperature water-gas-shift reactor needed to obtain certain CO outputs

FIG. 6 plots the results of calculations made using a mathematical model and an input gas comprising 5.54% CO, 20.50% $H_2O$, 12.25% $CO_2$, 31.55% $H_2$, balance $N_2$, flowing at a flow rate of 46.62 mole/min. The calculations show that 2.57 liters of reactor size is needed to drop the CO concentration from 1.14% to 0.72%. This excess reactor size can be eliminated by injecting air into the tail section of the shift reactor to consume the CO therein more effectively than the $H_2O$ can do it. Using the same model, the same gas, the same flow rate, a temperature of 230° C. and a pressure of 30 psig, the calculations show that a reactor that initially (i.e. with no $O_2$ injection) required a 8.48 liter volume to obtain 0.72% CO output could be reduced to a volume of 5.91 L (i.e. 2.94 liters in the upstream section and 2.97 L in the tail section) to produce the same results.

While the invention has been described in terms of a specific embodiment thereof it is not intended to be limited thereto, but rather only to the extent set forth hereafter in the claims which follow.

What is claimed is:

1. A process for operating a fuel cell system comprising:

reforming a hydrocarbon to produce a reformate comprising $H_2$ and CO as a fuel stream for said fuel cell system;

reacting said reformate with steam in the presence of a catalyst in a water-gas-shift reactor to reduce the CO content of said reformate, said catalyst having an upstream portion that reduces the CO content in said reformate to less than about 2% by volume and a downstream portion that receives said reformate from said upstream portion and further reduces the CO content thereof; and injecting oxygen into said downstream portion in order to further reduce the CO content in the reformate whereby the amount of catalyst required to effect said further CO reduction in the reformate is reduced.

2. The process according to claim 1 wherein said oxygen is injected into said downstream portion so as to provide a reformate and oxygen mixture therein comprising less than about 1% by volume of oxygen in the mixture.

* * * * *